United States Patent [19]
Alford et al.

[11] Patent Number: 6,147,793
[45] Date of Patent: Nov. 14, 2000

[54] BACKCONVERSION-LIMITED OPTICAL PARAMETRIC OSCILLATORS

[75] Inventors: William J. Alford; Arlee V. Smith, both of Albuquerque, N. Mex.

[73] Assignee: Sandia Corporation, Albuquerque, N. Mex.

[21] Appl. No.: 08/984,654

[22] Filed: Dec. 3, 1997

[51] Int. Cl.[7] .................................................. G02F 1/39
[52] U.S. Cl. ............................................................ 359/330
[58] Field of Search .................................. 359/326–332; 372/21–22

[56] References Cited

U.S. PATENT DOCUMENTS

| | | | |
|---|---|---|---|
| 3,628,186 | 12/1971 | Ashkin et al. | 359/330 X |
| 4,180,751 | 12/1979 | Ammann | 359/330 |
| 5,274,495 | 12/1993 | Shirasaki | 359/330 |
| 5,812,305 | 9/1998 | Blake et al. | 359/330 |

*Primary Examiner*—John D. Lee
*Attorney, Agent, or Firm*—Brian W. Dodson

[57] ABSTRACT

A more efficient class of optical parametric oscillators is made possible by introducing means for reducing signal losses due to backconversion of signal photons in the nonlinear optical medium.

2 Claims, 4 Drawing Sheets

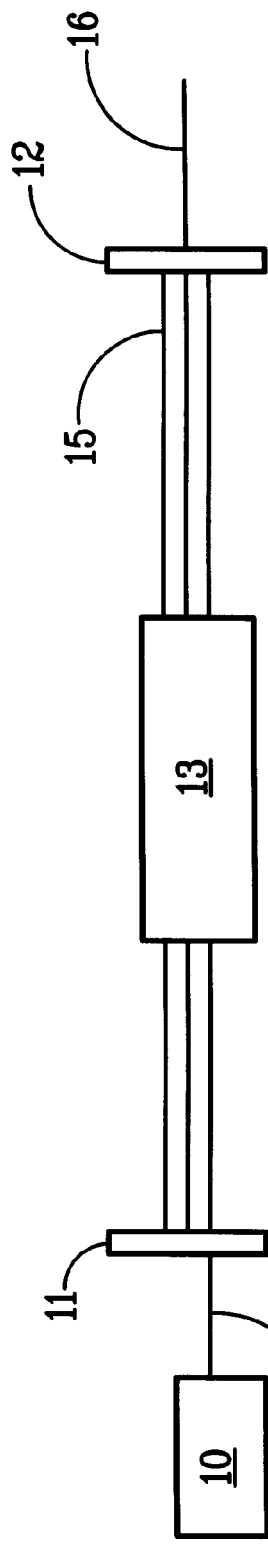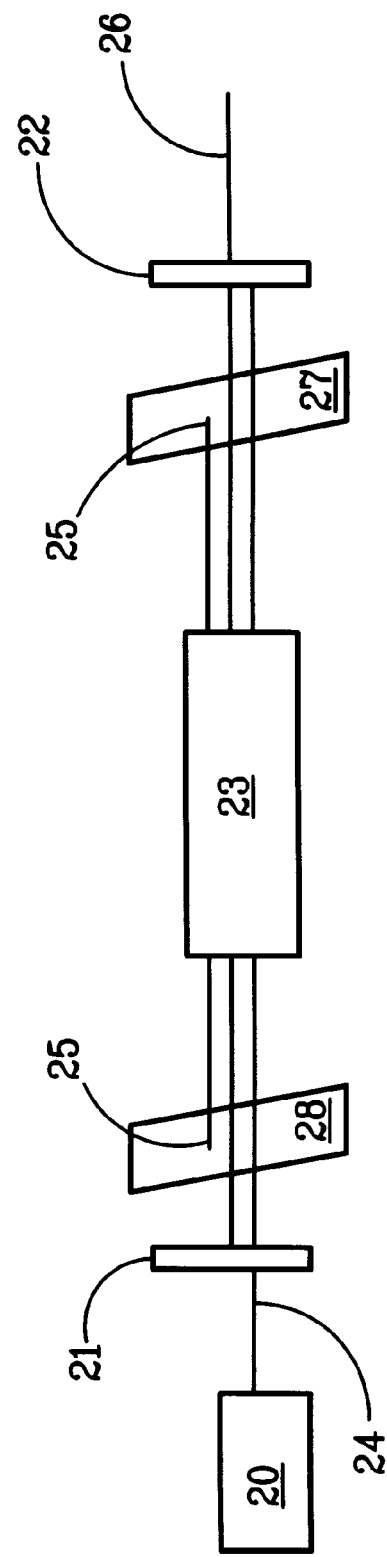

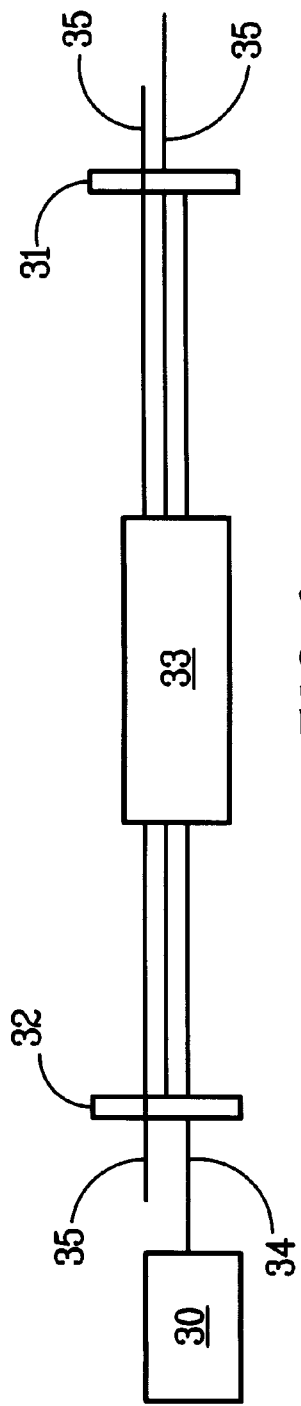
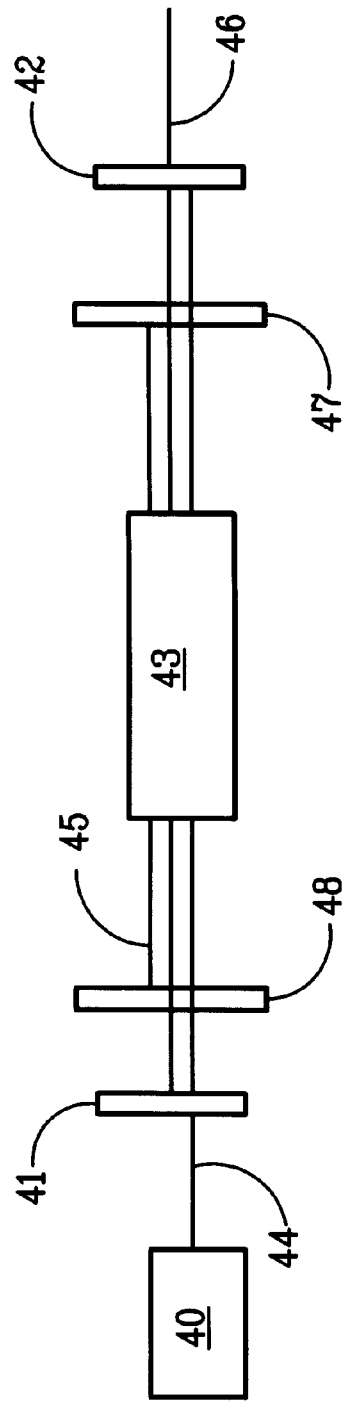

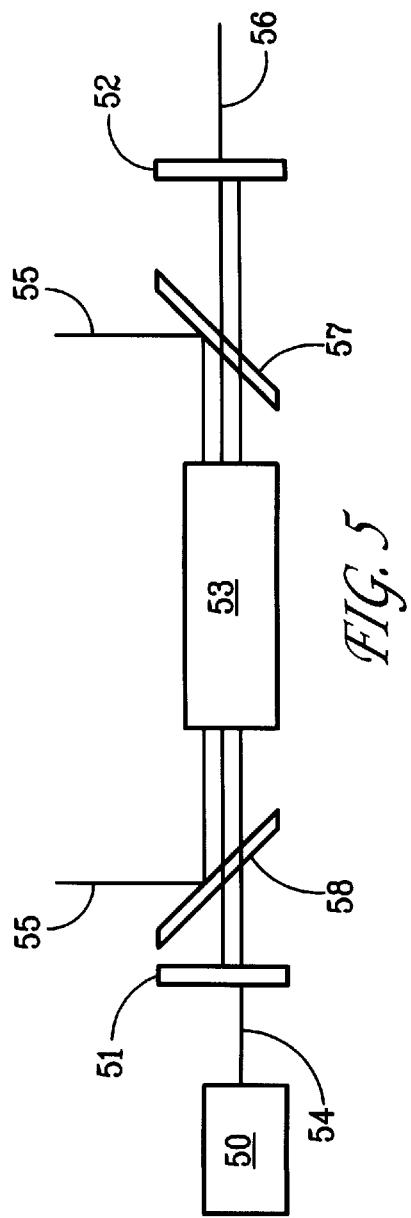
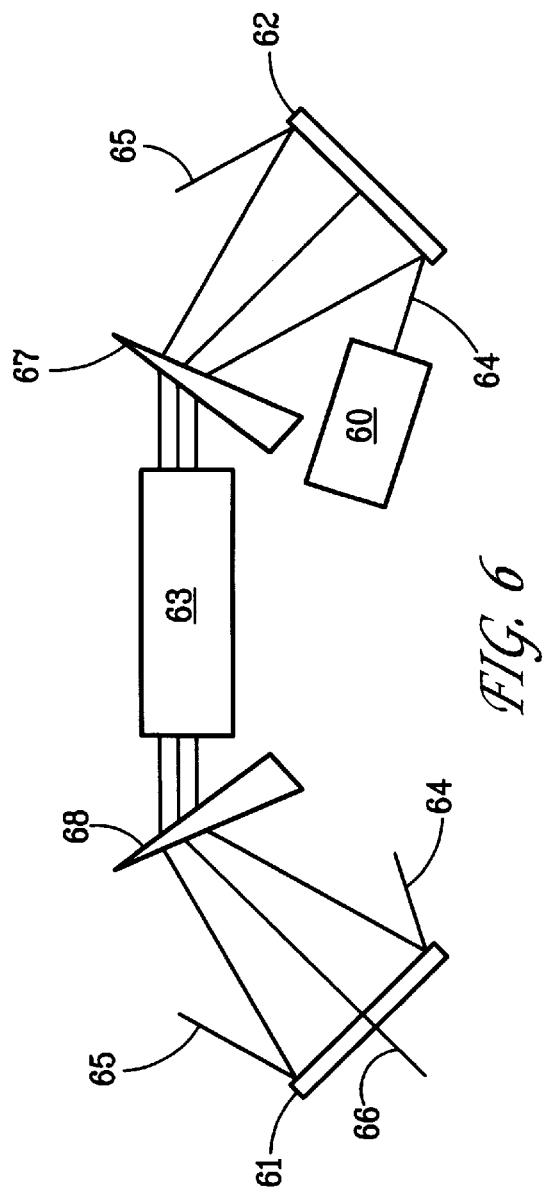

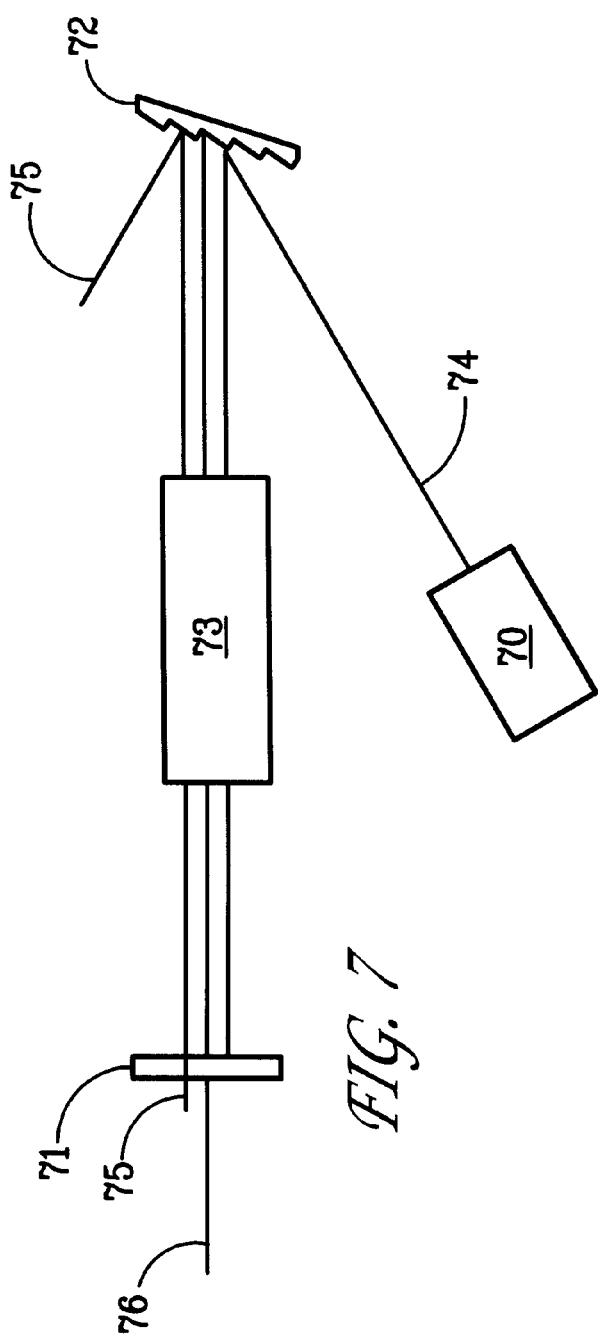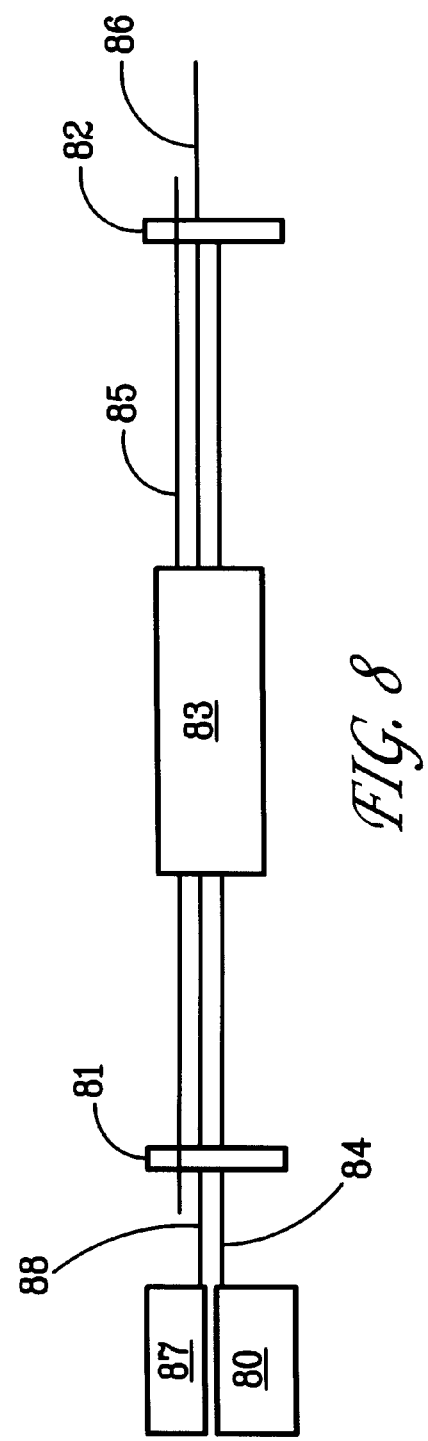

BACKCONVERSION-LIMITED OPTICAL PARAMETRIC OSCILLATORS

This invention was made with Government support under Contract DE-AC04-94DP85000 awarded by the U.S. Department of Energy. The Government has certain rights in the invention.

BACKGROUND

The present invention relates to optical parametric oscillators which are optical devices pumped by a coherent light source.

Optical parametric amplification (OPA) is a nonlinear optical process whereby light at one wavelength, the pump wavelength, is used to generate light at two other (longer) wavelengths in a material having a non-vanishing nonlinear susceptibility. When such a pumped material is placed in an optical cavity, an optical parametric oscillator (OPO) results. The relatively weak nonlinearities of optical materials made OPA and OPO impractical until the advent of the laser, which provided an intense source of coherent light.

A schematic diagram of a prior art OPO appears in FIG. 1. The pump 10 provides a source of intense coherent radiation in the form of the pump wave 14. A suitable nonlinear optical material 13 is placed in the optical cavity formed by mirrors 11 and 12. Mirror 11 is essentially transparent to pump wave 14, thereby providing a pump source to nonlinear optical material 13. Mirror 12 is partially transparent to the signal wave 16, which along with the idler wave 15 is generated by nonlinear interaction of pump wave 14 with nonlinear optical material 13. For simplicity, FIG. 1 shows all three waves propagating along a phasematch or quasi-phasematch direction within nonlinear optical material 13, a situation known as collinear phase matching. More generally, collinearity of the three waves is not required for OPO function.

An average photon from signal wave 16 makes multiple passes through nonlinear optical medium 13 before escaping from the optical cavity through mirror 12. Such apparatus can provide reasonably efficient (10–20%) conversion of pump photons into signal photons.

Like excited optical laser media, OPA involves optical gain and amplification of light. In laser media, however, there is no fundamental relationship between the coherence or lack thereof of the excitation energy and the laser radiation. In contrast, in OPA the pump source must be coherent light, and the output energy is coherently coupled and phase-locked to the laser pump.

In a suitable nonlinear material, usually a birefringent crystal with a nonvanishing second order nonlinear susceptibility, optical gain is established at two wavelengths, conventionally referred to as the signal and idler wavelengths. The sum of the energies of a signal photon and an idler photon are equal to the energy of a pump photon. There is no fundamental physical distinction between the idler wave and the signal wave. For the present application, the signal wavelength is the desired output wavelength of the optical parametric oscillator.

To obtain a useful device, it is necessary to be able to choose a specific signal wavelength. This is made possible within the nonlinear material itself, as useful gain appears only when the pump wave, the signal wave, and the idler wave can propagate and stay in phase with each other.

This in-phase condition is difficult to establish. Optical materials generally exhibit a property called dispersion, in which the refractive index varies with wavelength. Normally, shorter wavelength light propagates more slowly than do longer wavelengths. Consequently, as waves with different frequencies propagate they rapidly move in and out of phase with each other. The resulting interference prevents the signal wave from experiencing significant optical gain.

However, as is known in the art, in some birefringent materials, for particular temperatures and propagation directions, the difference in refractive index between ordinary and extraordinary waves can be used to offset the effects of dispersion at a desired signal wavelength. This phase-matched condition allows phase coherence to be maintained as the beams propagate, resulting in growth of the signal and idler waves.

Another technique for obtaining optical gain in the active medium of an optical parametric oscillator is to periodically change the relative phase of the pump, signal, and idler waves in the medium, thereby preventing the phase difference between these waves from becoming large enough to reduce the optical gain of the nonlinear medium to a point where the oscillator will not function. This approach, called quasi-phase-matching, is typically accomplished by changing crystal properties (e.g., ferroelectric polarization direction) as a function of propagation distance through the crystal. This technique has been used in $LiNbO_3$ and $KTiOPO_4$ (KTP). Unless otherwise differentiated, use of the term "phase-matching" and related terms such as phase-matched will include the equivalent condition accomplished using quasi-phase matching.

Suitable nonlinear optical media include $KTiOPO_4$ (KTP) and its isomorphs, $KH_2PO_4$ (KDP) and its isomorphs, $LiNbO_3$ and its isomorphs, potassium pentaborate tetrahydrate (KB5) and its isomorphs, lithium formate (LFM) and its isomorphs, $Ca_4GdO(BO_3)_3$ and its isomorphs, Se, Te, III-V semiconductors, II-VI semiconductors, semiconductor quantum-well materials, HgS (cinnabar), quartz, $Ag_3AsS_3$ (proustite) and its isomorphs, $LiB_3O_5$, $Li_2B_4O_7$, $KBe_2BO_3F_2$, $\beta$-$BaB_2O_4$, $AgGaS_2$, $\alpha$-$HIO_3$, $BeSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$ and its isomorphs, $CsLiB_6O_{10}$, urea, cesium dihydroarsenate, and L-arginine phosphate. The instant invention may be implemented using any of the above materials, and any other nonlinear optical materials having suitable properties which may presently exist or be introduced in the future.

A prior art technique to reduce the amount of pump energy required to obtain efficient conversion and which often increases the ultimate conversion efficiency is called seeding. The nonlinear optical process which is at the foundation of OPO function is three-wave mixing, whereby a pump photon is converted into a signal photon and an idler photon. The standard coupled-wave theory of three-wave mixing shows that the rate of such conversion is proportional to the initial number of signal photons (or idler photons) within the nonlinear optical medium when the pump wave is initiated. In the absence of an external source of such photons, the only such photons are generated by vacuum fluctuations. As their density is very small, the process of amplifying these "intrinsic" signal photons into the desired signal is a difficult process.

The buildup of the signal wave can be accomplished more effectively by "seeding" the OPO. This is done by sending a small wave at the desired signal (or idler) wavelength into the nonlinear optical medium of the OPO along the OPO axis to be used just prior to initiating the pump pulse. Even a very small amount of seeding power (microwatts) will provide orders of magnitude greater signal photon densities at the start of OPO operation, which can significantly reduce the pump energy threshold and increase the conversion efficiency.

Recent work has shown that a process which significantly limits the conversion efficiency of pulsed OPOs is backconversion, which is conversion of a signal photon and an idler photon to a photon having the energy and propagation direction of the pump wave. Such loss of signal photons diminishes the signal wave and reduces the optical gain of the medium. The conventional response in the art to this reduction in the optical conversion of the medium is to increase the thickness of the nonlinear optical medium, thereby restoring the total gain of the OPO to a usable level. This design approach, although yielding functional OPOs, severely limits the conversion efficiency (signal power/pump power). Typical values for conversion efficiency are in the neighborhood of 10–20%.

There exists a long-standing need in this field for OPO systems exhibiting conversion efficiencies much greater than 20%. In particular, applications for OPOs include medical diagnosis, medical treatment, and remote sensing. These applications require moderate amounts of laser power at wavelengths inaccessible to highly efficient laser sources, and thus are candidates for OPO utilization.

The present invention seeks to satisfy the aforementioned needs by introducing a new class of OPO in which backconversion is greatly reduced. The principal technique for such reduction is to limit the density of idler photons propagating in the nonlinear optical medium of the OPO. Various embodiments and other features, aspects, and advantages of the present invention will become better understood with reference to the following description and appended claims.

SUMMARY

The present application is directed to a new class of optical parametric oscillator in which backconversion of signal and idler photons is minimized by limiting the propagation of idler photons in the nonlinear optical medium of the OPO.

BRIEF DESCRIPTION OF THE ILLUSTRATIONS

FIG. 1 shows a schematic diagram of a prior art optical parametric oscillator.

FIG. 2 shows a schematic diagram of a new class of optical parametric oscillator comprising reducing means to reduce the intensity of the idler wave within the optically active medium.

FIG. 3 shows a schematic diagram of an optical parametric oscillator where the reducing means comprise a mirror substantially transparent to the idler wave.

FIG. 4 shows a schematic diagram of an optical parametric oscillator where the reducing means comprise a filter substantially transparent to the signal wave but which substantially absorbs the idler wave.

FIG. 5 shows a schematic diagram of an optical parametric oscillator where the reducing means comprise a mirror having substantially complete transmissivity for the signal wave and substantially complete reflectivity for the idler wave.

FIG. 6 shows a schematic diagram of an optical parametric oscillator where the reducing means comprise an optically dispersive prism.

FIG. 7 shows a schematic diagram of an optical parametric oscillator where the reducing means comprise an optically dispersive reflective diffraction grating.

FIG. 8 shows a schematic diagram of a seeded optical parametric oscillator.

DETAILED DESCRIPTION

Backconversion is a three-photon process taking place in a nonlinear medium, having a signal photon and an idler photon as input and a photon having the same wavelength as the pump photons as output. Accordingly, backconversion is most detrimental to the operation of an OPO when the spatial density of the signal photons and of the idler photons in the nonlinear medium is roughly equal. This principle will be used as the basis for designing a new class of optical parametric oscillator (OPO) which reduces backconversion losses by removing idler photons from the active region of the OPO.

This principle is illustrated schematically in FIG. 2. Here a nonlinear optical medium 23 is positioned in an optical cavity comprising a pump mirror 21, an output mirror 22, and reducing means 27 and 28 which reduce backconversion of the signal wave 26 and the idler wave 25. An optical pump 20 generates and directs pump wave 24 into the optical cavity by passing through pump mirror 21, which is substantially transparent to the pump wave but substantially totally reflective for the signal and idler waves. In contrast, output mirror 22 substantially totally reflects the pump wave and the idler wave, but only partially reflects the signal wave. The resulting optical cavity is resonant for the signal wave while allowing a portion of the signal wave to escape on each pass as useable output.

Pump wave 24, the optical cavity, and nonlinear optical medium 23 must be mutually oriented so that pump wave 24, idler wave 25, and signal wave 26 are phase-matched within the nonlinear optical medium. Only such orientation allows significant conversion of the pump wave into the idler wave and signal wave.

Reducing means 27 and 28 are placed within the optical cavity, and function by diverting the idler wave from multiple phase-matched propagation through nonlinear optical medium 23. By so doing, the reducing means reduce the amount of backconversion of the signal wave 26 and the idler wave 25 into the pump wave 24, resulting in dramatically larger conversion efficiencies (as much as 70–80% conversion of pump photons into signal photons).

This new class of OPO can in principle function if the reducing means allows the idler wave generated within the nonlinear optical medium to be reinjected into the nonlinear optical medium. This would be the case if, e.g., reducing means 28 did not exist, and the idler wave reflected from mirror 21 and thereafter reentered nonlinear optical medium 23. However, the effect of such reinjection depends crucially on the relation of the phases of the signal and pump waves to the phase of the reinjected portion of the idler wave. As the relative phases shift significantly when the relative distance between the optical elements in the cavity change by sub-micron distances, a better operational configuration usually results when the reducing means also substantially prevent the idler wave from being reinjected into the nonlinear optical medium. This can be accomplished using various combinations of the reducing means discussed hereafter. All such combinations are included within the scope of the present invention, as are implementations in which reinjection of the idler wave is allowed.

Many suitable optical cavity designs, including Fabry-Perot, ring resonators, and symmetrical confocal sphericalmirror resonators, are known in the art. The optical cavities discussed in the instant application are generally variations of the Fabry-Perot resonator geometry which are stable at the desired signal wavelength, but neither of these restrictions is essential to practicing the instant invention.

A simple approach to implementing such reducing means appears in FIG. 3. Pump 30 generates pump wave 34, and directs it into the optical cavity comprising input mirror 32 and output coupler 31. This optical cavity also includes nonlinear optical medium 33, which is positioned and oriented so that pump wave 34, idler wave 35, and signal wave 36 propagate phase-matched through 33. Here input mirror 32 and output coupler 31 are given special properties which allow them to function as backconversion reducing means. Input mirror 32 is substantially transparent to the pump wave and the idler wave and substantially totally reflective to the signal wave. Similarly, output coupler 31 is substantially transparent to the idler wave, substantially completely reflective to the pump wave, and partially reflective and partial transmissive to the signal wave. Mirror 32 and coupler 31 carry out the function of reducing backconversion by allowing the idler wave to escape from the optical cavity.

Note that although optimum function of such an OPO requires that input mirror 32 and output coupler 31 have extremum properties (substantially complete transparency, reflectivity, and absorption, as appropriate), successful implementation of the instant invention does not require such extremum properties. In the above case, for example, output coupler 31 need not be completely transparent to signal wave 36 for a usable output to appear, and a significant signal can be generated even if output coupler 31 is transparent to the pump wave 34. Thus, although near-optimum configurations are consistently used in the implementations described, all related configurations which one skilled in the art would be able to make functional without undue experimentation are intended to be covered by the instant application.

A different approach toward limiting backconversion appears in FIG. 4. Pump 40 generates pump wave 44, and directs it into the optical cavity comprising input mirror 41 and output coupler 42. This optical cavity also includes nonlinear optical medium 43, which is positioned and oriented so that pump wave 44, idler wave 45, and signal wave 46 are phase-matched as they propagate through 43. Input mirror 41 has essentially complete transparency to pump wave 44 and essentially complete reflectivity to signal wave 46. Output coupler 42 has substantially complete reflection of pump wave 44 combined with partial reflection and partial transmission of signal wave 46. A new pair of components, filters 47 and 48, serve as the reducing means. Filters 47 and 48 are essentially completely transparent to signal wave 46 and pump wave 44, but provides essentially complete blocking of idler wave 45 from continued propagation in the optical cavity. This blocking, which can be accomplished by absorption, scattering, or other suitable optical effects well known in the art, reduces the opportunity for backconversion, thus increasing the overall conversion efficiency of the OPO.

A special case of considerable interest because of its intrinsic simplicity occurs when the function of filters 47 and 48 is subsumed into the intrinsic properties of the nonlinear optical medium 43. That is, if the idler wave is generated at a frequency which is absorbed by the nonlinear optical medium, the idler wave never has a chance to grow, even when such absorption does not significantly influence the nonlinear 3-photon process which generates signal and idler photons from pump photons. When practical, this results in a particularly simple implementation of a backconversion-limited OPO.

Another approach to diversion of the idler wave from the OPO appears in FIG. 5. Pump 50 generates pump wave 54, and directs it into the optical cavity comprising input mirror 51 and output coupler 52. This optical cavity also includes nonlinear optical medium 53, which is positioned and oriented so that pump wave 54, idler wave 55, and signal wave 56 propagate phase-matched through 53. Input mirror 51 has essentially complete transparency to pump wave 54 and essentially complete reflectivity to signal wave 56. Output coupler 52 has substantially complete reflectivity to pump wave 54 combined with partial reflection and partial transmission of signal wave 56. Beamsplitters 57 and 58 serve as the reducing means. The beamsplitters are essentially completely transparent to signal wave 56 and pump wave 54, but provide essentially complete reflection of idler wave 55, thereby removing it from the optical cavity. Such beamsplitters can be made using layered dielectric optics, although other approaches are known in the art. This reduces the opportunity for backconversion, thus increasing the overall conversion efficiency of the OPO.

The idler wave can also be removed from the optical cavity using dispersive optical elements. One such implementation appears in FIG. 6. An optical cavity at the signal wave frequency is formed by output coupler 61, input mirror 62, and prisms 67 and 68. The relative positions and orientation of these four components is such that a stable resonator is formed for light at the signal wave frequency. Pump 60 generates pump wave 64, and directs it onto input mirror 62 so that it reflects onto prism 67 at a position and angle such that it passes through the optical cavity on the axis for which the optical cavity is stable for light at the signal frequency. This optical cavity also contains nonlinear optical medium 63, which is positioned and oriented so that pump wave 64, idler wave 65, and signal wave 66 propagate phase-matched through 63, and prism 68. Input mirror 62 exhibits essentially complete reflectivity to pump wave 64 and signal wave 66. Output coupler 61 exhibits substantially complete reflection of pump wave 64 and partial reflection and partial transmission of signal wave 66. The optical dispersion of prism 67 and prism 68 renders the optical cavity unstable for the idler wave, thus removing said wave from the optical cavity. Properly applied, this design approach will also prevent idler wave reinjection. Note that many OPO configurations which use the optical dispersion offered by prisms are equivalent in essence to the above implementation, e.g., the dispersion is used to divert the idler wave from the optical cavity. All such configurations are intended to be included as part of the instant invention.

A related implementation appears in FIG. 7. Here, an optical cavity is formed at the signal wave frequency by output coupling 71 and input grating 72, which exhibits significant optical dispersion. The relative positions and orientation of these components are such that a stable cavity is formed for light at the signal wave frequency and propagating through nonlinear optical medium 73. Pump 70 generates pump wave 74, and directs it onto input grating 72 so that it passes through the optical cavity on the axis for which the optical cavity is stable for light at the signal frequency. This optical cavity also contains nonlinear optical medium 73, which is positioned and oriented so that pump wave 74, idler wave 75, and signal wave 76 propagate phase-matched through 73.

Input grating 72 exhibits essentially complete reflectivity of pump wave 74 and signal wave 76. Output coupling 71 exhibits substantially complete reflection of pump wave 74, substantially complete transmissivity of idler wave 75, and partial reflection and partial transmission of signal wave 76. (A second grating is generally not used to replace output coupling 71, as removing the signal wave from the optical cavity then becomes difficult.) The optical dispersion of input grating 72 renders the optical cavity unstable for the idler wave, thus removing it quickly from the optical medium. Proper design will again prevent idler wave reinjection. Again, many OPO configurations which use the optical dispersion offered by a grating are equivalent in essence to the above implementation, e.g., the dispersion is used to divert the idler wave from the optical cavity. All such configurations are intended to be included as part of the instant invention.

A technique which can be combined with any of the above implementations to further reduce backconversion and improve OPO conversion efficiency is to reduce the length of the nonlinear optical medium along the propagation direction of the signal wave. The number of pump photons converted to a signal photon and an idler photon per pass through the nonlinear optical medium is an increasing function of the length of said medium. Reducing the propagation distance through the medium also reduces the idler photons generated per pass, and thus reduces the density of idler photons within the nonlinear optical medium. The production of signal photons is similarly reduced, but the number of signal photons which escape per pass through the optical cavity is determined by the leakage rate of the optical cavity at the signal frequency. As a result, the overall efficiency of the OPO can be optimized by varying the length of the nonlinear optical medium and the leakage rate of the optical cavity. Note that as most pulsed OPO are intended for applications which favor the use of short pulses, reducing the overall optical length of the optical cavity to the extent allowed by the size of the nonlinear optical medium is usually a favorable design principle because it maximizes the number of passes the signal wave can take through the nonlinear optical medium during the pump pulse.

As described earlier, seeding of a backconversion-limited OPO can also improve conversion efficiency. One implementation of this modification is shown in FIG. 8. Pump 80 is oriented to send pump wave 84 into the optical cavity comprising input mirror 81, the nonlinear optical medium 83, and output coupler 82. The nonlinear optical medium 83 is oriented so that the pump wave generates a phase-matched signal wave 86 and idler wave 85. Immediately prior to the generation of pump wave 84, however, seed generator 87 generates an optical pulse 88 at the desired signal frequency and injects it into the optical cavity so that it is phase-matched with the pump wave to come. Optical pulse 88 serves to pre-populate the nonlinear optical medium with a suitable signal wave, thereby giving it a head start toward efficient operation.

The examples of backconversion-limited optical parametric oscillators described above are for purposes of illustration only, and are not intended to limit the scope of the present invention. That scope is defined only by the claims appended.

What is claimed is:

1. An optical parametric oscillator, comprising:

i) an optical pump, which generates a pump wave with suitable intensity at a pump frequency greater than a desired signal frequency;

ii) a nonlinear optical medium oriented so that a signal wave at the desired signal frequency and an idler wave are produced when the pump wave propagates through the nonlinear optical medium, said medium being short enough to avoid backconversion;

iii) an optical cavity which is resonant to the signal wave and directs said wave to repeatedly pass through the nonlinear optical medium.

2. An optical parametric oscillator, comprising:

i) an optical pump, which generates a pump wave with suitable intensity at a pump frequency greater than a desired signal frequency;

ii) a nonlinear optical medium oriented so that a signal wave at the desired signal frequency and an idler wave are produced when the pump wave propagates through the nonlinear optical medium, said medium being short enough to avoid backconversion;

iii) an optical cavity which is resonant to the signal wave and directs said wave to repeatedly pass through the nonlinear optical medium, said optical cavity being short enough to substantially prevent backconversion in said medium.

* * * * *